US006500397B1

(12) United States Patent
Yoshida et al.

(10) Patent No.: US 6,500,397 B1
(45) Date of Patent: *Dec. 31, 2002

(54) METHOD FOR REMOVING CARBON DIOXIDE FROM COMBUSTION EXHAUST GAS

(75) Inventors: Kunihiko Yoshida; Tomio Mimura; Shigeru Shimojo, all of Osaka; Mutsunori Karasaki; Masaki Iijima, both of Tokyo; Touru Seto; Shigeaki Mitsuoka, both of Hiroshima, all of (JP)

(73) Assignees: The Kansai Electrical Power Co., Inc., Osaka (JP); Mitsubishi Jukogyo Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/187,168

(22) Filed: Nov. 6, 1998

Related U.S. Application Data

(63) Continuation of application No. 08/867,988, filed on Jun. 3, 1997, now abandoned, which is a continuation of application No. 08/741,582, filed on Nov. 1, 1996, now abandoned, which is a continuation of application No. 08/328,398, filed on Oct. 24, 1994, now abandoned, which is a continuation of application No. 08/021,378, filed on Feb. 23, 1993, now abandoned.

(30) Foreign Application Priority Data

| Feb. 27, 1992 | (JP) | 4-40807 |
| Feb. 27, 1992 | (JP) | 4-40808 |
| Sep. 16, 1992 | (JP) | 4-246395 |
| Sep. 16, 1992 | (JP) | 4-246396 |

(51) Int. Cl.$^7$ .................................... B01D 53/62
(52) U.S. Cl. ......................... 423/228; 423/229
(58) Field of Search ........................... 423/228, 229

(56) References Cited

U.S. PATENT DOCUMENTS

| RE18,958 E | | 9/1933 | Bottoms | 423/229 |
| 3,856,921 A | * | 12/1974 | Shrier et al. | 423/228 |
| 4,101,633 A | * | 7/1978 | Sartori et al. | 423/228 |
| 4,112,052 A | * | 9/1978 | Bartori et al. | 423/228 |
| 4,336,233 A | * | 6/1982 | Appl et al. | 423/229 |
| 4,372,873 A | * | 2/1983 | Nieh | 423/229 |
| 4,440,731 A | * | 4/1984 | Pearce | 423/228 |
| 4,477,419 A | * | 10/1984 | Pearce et al. | 423/229 |
| 4,624,839 A | * | 11/1986 | Wolcott et al. | 423/228 |
| 4,729,883 A | * | 3/1988 | Lam et al. | 423/228 |
| 5,209,914 A | * | 5/1993 | Peytavy et al. | 423/228 |
| 6,036,931 A | * | 3/2000 | Yoshida et al. | 423/228 |

FOREIGN PATENT DOCUMENTS

| EP | 376636 | * | 7/1990 |
| GB | 1567943 | | 5/1980 |
| GB | 1567944 | | 5/1980 |
| GB | 1593420 | | 7/1981 |
| JP | 1-231921 | | 9/1989 |

OTHER PUBLICATIONS

Dictionary of Science and Technology—Collocot, et al (1974) p. 470.
Data Book on Hydrocarbons—Application to Process Engineering—J.B. Maxwell (1950) pp. 178–183, 189–192.
The Absorption of Carbon Dioxide into Solutions of Alkalis and Amines—Danckwerts, et al—The Chemical Engineer, CE 245, Oct. 1966.
The Absorption of Carbon Dioxide into Aqueous Amines and the Effects of Catalysis—Danckwerts, et al—Trans. Instn. Chem. Engrs., T33, vol. 45 (1967).
Carbon Dioxide Absorption into Amine–Promoted Potash Solutions—Shrier, et al—I & EC Fundamentals, pp 415–423, vol. 8, No.3, (1969).
Encyclopedia of Chemical Technology, Vol. 3, Interscience, New York, 1954, pp. 128–133 "Carbon Dioxide".

* cited by examiner

*Primary Examiner*—Steven Bos
*Assistant Examiner*—Timothy C Vanoy
(74) *Attorney, Agent, or Firm*—Reed Smith LLP

(57) ABSTRACT

There are disclosed a method for removing $CO_2$ from a combustion exhaust gas which comprises the step of bringing the combustion exhaust gas under atmospheric pressure into contact with an aqueous solution of a hindered amine selected from the group consisting of 2-amino-2-methyl-1-propanol, 2-methylaminoethanol, 2-ethylamino-ethanol and 2-piperidineethanol; and another method for removing carbon dioxide from a combustion exhaust gas which comprises the step of bringing the combustion exhaust gas under atmospheric pressure into contact with a mixed aqueous solution of 100 parts by weight of an amine compound (X) selected from the group consisting of 2-amino-2-methyl-1, 3-propanediol, 2-amino-2-methyl-1-propanol, 2-amino-2-ethyl-1, 3-propanediol, t-butyldiethanolamine and 2-amino-2-hydroxymethyl-1,3-propanediol; and 1–25 parts by weight of an amine compound (Y) selected from the group consisting of piperazine, piperidine, morpholine, glycine, 2-methylamino-ethanol, 2-piperidineethanol and 2-ethylaminoethanol.

7 Claims, 5 Drawing Sheets

METHOD FOR REMOVING CARBON DIOXIDE FROM COMBUSTION EXHAUST GAS

This is a continuation of application Ser. No. 08/867,988, filed Jun. 3, 1997, now abandoned which, in turn, is a continuation of application Ser. No. 08/741,582, filed Nov. 1, 1996, now abandoned, which, in turn, is a continuation of application Ser. No. 08/328,398, filed Oct. 24, 1994, now abandoned, which, in turn, is a continuation of application Ser. No. 08/021,378, filed Feb. 23, 1993, now abandoned.

FIELD OF THE INVENTION AND RELATED ART STATEMENT

The present invention relates to a method for removing $CO_2$ (carbon dioxide) from a combustion exhaust gas. More specifically, it relates to a method for removing $CO_2$ from a combustion exhaust gas under atmospheric pressure by the use of a specific mixed aqueous solution containing an amine.

In recent years, a greenhouse effect by $CO_2$ is indicated as one cause of the warming phenomenon of the earth, and its prompt resolution is globally required in order to protect earth circumstances. The generation sources of $CO_2$ extend in active fields of all humans in which fossil fuels are burned, and there is a tendency that the discharge regulation of $CO_2$ will be further tightened in the future. Thus, for power generation facilities such as thermoelectric power plants in which a large amount of the fossil fuel is used, there are energetically researched a method for removing and recovering $CO_2$ from a combustion exhaust gas by bringing the combustion exhaust gas coming from a boiler into contact with an aqueous alkanolamine solution or the like, and a method for storing the recovered $CO_2$ without discharging it into the atmosphere.

Examples of the alkanolamine include monoethanolamine, diethanolamine, triethanolamine, dimethyldiethanolamine, diisopropanolamine and diglycolamine, and in general, monoethanolamine (abbreviated to "MEA") is preferably used.

However, even if the above-mentioned aqueous alkanolamine solution typified by MEA is used as an absorbing solution for absorbing/removing $CO_2$ from a combustion exhaust gas, the effect of the alkanolamine is not always satisfactory in view of an amount of absorbed $CO_2$ per predetermined amount of the aqueous alkanolamine solution having a predetermined concentration, an amount of absorbed $CO_2$ per unit amine mole of the aqueous alkanolamine solution having a predetermined concentration, an absorption rate of $CO_2$ at a predetermined concentration, heat energy required to recover the aqueous alkanolamine solution after the absorption, and the like.

In the meantime, for the separation of an acidic gas from various mixed gases by the use of an amine compound, many techniques are known.

Japanese Patent Application Laid-open No. 100180/1978 discloses a method for removing an acidic gas which comprises bringing a usually gaseous mixture into contact with an amine-solvent liquid absorbent comprising (1) an amine mixture comprising at least 50 mole % of a steric hindrance amine constituting a part of a ring and having at least one secondary amino group bonded to either of a secondary carbon atom or a tertiary carbon atom or a primary amino group bonded to the tertiary carbon atom, and at least about 10 mole % of the tertiary amino-alcohol, and (2) a solvent for the above-mentioned amine mixture which functions as a physical absorbent for the acidic gas. Usable examples of the steric hindrance amine include 2-piperidine ethanol [2-(2-hydroxyethyl)-piperidine] and 3-amino-3-methyl-1-butanol, and a usable example of the tertiary amino-alcohol is 3-dimethylamino-1-propanol. Furthermore, an example of the solvent is a sulfoxide compound which may contain water in an amount of 25% by weight or less, and an example of a gas to be treated is "a usually gaseous mixture containing carbon dioxide and hydrogen sulfide at high concentrations, for example, 35% Of $CO_2$ and 10–12% of $H_2S$" on page 1, left upper column of the same gazette. In the undermentioned examples, $CO_2$ itself is used.

In Japanese Patent Application Laid-open No. 71819/1986, there is described a composition for the scraping of an acidic gas which contains a non-aqueous solvent such as a steric hindrance amine or sulfolane. As an example of the primary monoamino alcohol of the steric hindrance, 2-amino-2-methyl-1-propanol (abbreviated to AMP) is exemplified and used. In examples, $CO_2$ and nitrogen as well as $CO_2$ and helium are used. Furthermore, as absorbents, an aqueous solution of an amine and potassium carbonate, and the like are used. The use of water is also referred to. In addition, this gazette describes the advantage of the steric hindrance amine in the absorption Of $CO_2$ by reaction formulae.

In Chemical Engineering Science, Vol. 41, No. 4, pp. 997–1,003, there is disclosed a carbon dioxide gas absorption behavior of an aqueous AMP solution which is a hindered amine. As gases to be absorbed, $CO_2$ and a mixture of $CO_2$ and nitrogen at atmospheric pressure are used.

Chemical Engineering Science, Vol. 41, No. 4, pp. 405–408 has reported absorption rates of an aqueous solution of a hindered amine such as AMP and an aqueous solution of a straight-chain amine such as MEA to $CO_2$ and $H_2S$ in the vicinity of ordinary temperature. According to this report, a large difference is not present between both the aqueous solutions, in the case that the partial pressure of $CO_2$ is 1 atm and the concentrations of the aqueous solutions are from 0.1–0.3 mole. However, it is apparent that when the concentrations of the aqueous solutions are 0.1 mole and the partial pressure of $CO_2$ is decreased to 1, 0.5 and 0.05 atm, the absorption rate of AMP deteriorates more largely than that of MEA at 0.05 atm.

U.S. Pat. No. 3,622,267 discloses a technique in which an aqueous mixture containing methyldiethanolamine and monoethylmonoethanolamine is used to purify a highpartial pressure $CO_2$ contained in a synthetic gas such as a partially oxidized gas of a crude oil or the like, for example, a synthetic gas containing 30% of $CO_2$ at 40 atm.

German Laid-open Patent No. 1,542,415 discloses a technique in which a monoalkylalkanolamine or the like is added to a physical or chemical absorbent in order to improve the absorption rate of $CO_2$, $H_2S$ and COS. Similarly, German Laid-open Patent No. 1,904,428 discloses a technique in which monomethylethanolamine is added for the purpose of improving the absorption rate of methyldiethanolamine.

U.S. Pat. No. 4,336,233 discloses a technique in which, for the purification of a natural gas, a synthetic gas or a gasified coal gas, a 0.81–1.3 mole/liter aqueous piperazine solution is used as a wash liquid, or piperazine is used in the state of an aqueous solution together with a solvent such as methyldiethanolamine, triethanolamine, diethanolamine or monomethylethanolamine as a wash liquid;

Similarly, Japanese Patent Application Laid-open No. 63171/1977 discloses a $CO_2$ absorbent obtained by adding piperazine or a piperazine derivative such as hydroxyethylpiperazine as an accelerator to a tertiary alkanolamine, a monoalkylalkanolamine or the like.

OBJECT AND SUMMARY OF THE INVENTION

As described above, a method for efficiently removing $CO_2$ from a combustion exhaust gas has been heretofore desired. In particular, in the case that the combustion exhaust gas is treated with an aqueous solution containing a $CO_2$ absorbent at a certain concentration, it is an urgent serious problem to select an absorbent which is capable of absorbing a large amount of $CO_2$ per unit mole of the absorbent and absorbing a large amount of $CO_2$ per unit volume of the aqueous solution and which has a high absorption rate. Furthermore, another requirement of the absorbent is to permit the separation of $CO_2$ and the recovery of the absorbing solution with a small amount of heat energy, after the absorption of $CO_2$. Above all, it is desired to improve the absorption rate of the absorbent having a large $CO_2$ absorption power but a low absorption rate.

In view of the above-mentioned problems, the present inventors have intensively investigated an absorbent for use in the removal of $CO_2$ from a combustion exhaust gas. As a result, they have found that the employment of a specific hindered amine is particularly effective, and thus the present invention has now been completed.

That is, the present invention is directed to a method for removing carbon dioxide from a combustion exhaust gas which comprises the step of bringing the combustion exhaust gas under atmospheric pressure into contact with an aqueous solution of a hindered amine (exclusive of an amine having two or more amino groups) selected from the group consisting of:

(A) a compound having an alcoholic hydroxyl group and a primary amino group, said primary amino group being bonded to a tertiary carbon atom having two unsubstituted alkyl groups, (B) a compound having an alcoholic hydroxyl group and a secondary amino group, said secondary amino group having an N atom bonded to a group having a chain of 2 or more carbon atoms inclusive of a bonded carbon atom, (C) a compound having an alcoholic hydroxyl group and a tertiary amino group, at least two groups bonded to said tertiary amino group having a chain of 2 or more carbon atoms inclusive of a bonded carbon atom, respectively, two of the groups bonded to said tertiary amino group being unsubstituted alkyl groups, and (D) a 2-substituted piperidine having a hydroxyl group-substituted alkyl group at the 2-position.

In the present invention, the above-mentioned hindered amine is particularly preferably selected from the group consisting of 2-amino-2-methyl-1-propanol, 2-(methylamino)-ethanol, 2-(ethylamino)-ethanol, 2-(diethylamino)-ethanol and 2-(2-hydroxyethyl)-piperidine.

Every hindered amine which can be used in the present invention has an alcoholic hydroxyl group in its molecule. It is preferred that one alcoholic hydroxyl group is present in the hindered amine molecule. Further more, the molecular weight of the hindered amine is preferably 150 or less from the viewpoint of $CO_2$ absorption power per unit amount of the solution at a predetermined concentration.

One of the hindered amines which can be used in the present invention is (A) a compound having an alcoholic hydroxyl group and a primary amino group, said primary amino group being bonded to a tertiary carbon atom having two unsubstituted alkyl groups. In this (A), the unsubstituted alkyl groups may be mutually identical or different, and examples of the unsubstituted alkyl groups include a methyl group, an ethyl group and a propyl group, but both of the unsubstituted alkyl groups are preferably the methyl groups. Typical examples of this (A) include 2-amino-2-methyl-1-propanol, 3-amino-3-methyl-2-pentanol, 2,3-dimethyl-3-amino-1-butanol, 2-amino-2-ethyl-1-butanol, 2-amino-2-methyl-3-pentanol, 2-amino-2-methyl-1-butanol, 3-amino-3-methyl-1-butanol, 3-amino-3-methyl-2-butanol, 2-amino-2,3-dimethyl-3-butanol, 2-amino-2,3-dimethyl-1-butanol and 2-amino-2-methyl-1-pentanol, and above all, 2-amino-2-methyl-1-propanol (AMP) is preferable.

Another amine of the hindered amines which can be used in the present invention is (B) a compound having an alcoholic hydroxyl group and a secondary amino group, said secondary amino group having an N atom bonded to a group having a chain of 2 or more carbon atoms inclusive of a bonded carbon atom. In this (B), the group having the chain of 2 or more carbon atoms inclusive of the bonded carbon atom is usually a hydroxy group-substituted alkyl group of 2–5 carbon atoms, preferably an alkyl group of 2–3 carbon atoms which may be substituted by the hydroxyl group. Typical examples of this (B) include 2-(ethylamino)-ethanol, 2-(methylamino)-ethanol, 2-(propylamino)-ethanol, 2-(isopropylamino)-ethanol, 1-(ethylamino)-ethanol, 1-(methylamino)-ethanol, 1-(propylamino)-ethanol and 1-(isopropylamino)-ethanol, and above all, 2-(ethylamino)-ethanol (hereinafter abbreviated to "EAE") and 2-(methyl-amino)-ethanol (hereinafter abbreviated to "MAE") are preferably used.

Still another amine of the hindered amines which can be used in the present invention is (C) a compound having an alcoholic hydroxyl group and a tertiary amino group, at least two groups bonded to said tertiary amino group having a chain of 2 or more carbon atoms inclusive of a bonded carbon atom, respectively, two of the groups bonded to said tertiary amino group being unsubstituted alkyl groups. In this (C), the two unsubstituted alkyl group may be mutually identical or different, and examples of the unsubstituted alkyl groups include a methyl group, an ethyl group, a propyl group and an isopropyl group. Typical examples of this (C) include 2-(dimethylamino)-ethanol, 2-(diethylamino)-ethanol, 2-(ethylmethylamino)-ethanol, 1-(dimethylamino)-ethanol, 1-(diethylamino)-ethanol, 1-(ethylmethylamino)-ethanol, 2-(diisopropylamino)-ethanol, 1-(diethylamino)-2-propanol and 3-(diethylamino)-1-propanol, and above all, 2-(diethylamino)-ethanol (herein after abbreviated to "DEAE") is preferably used.

Still another amine of the hindered amines which can be used in the present invention is (D) a 2-substituted piperidine having a hydroxyl group-substituted alkyl group at the 2-position. Typical examples of the 2-substituted piperidine include 2-(hydroxymethyl)-piperidine, 2-(2-hydroxyethyl)-piperidine and 2-(1-hydoxymethyl)-piperidine, and above all, 2-(2-hydroxyethyl)-piperidine (hereinafter abbreviated to "HEP") is preferable.

The hindered amines for use in the present invention selected from the above-mentioned groups can be utilized singly or in the form of a mixture.

The concentration of the aqueous hindered amine solution which can be used as an absorbing solution is usually from 25 to 65% by weight, depending upon the kind of hindered amine. The temperature of the aqueous hindered amine solution at the time of the contact with the combustion exhaust gas is usually in the range of 30 to 70° C.

If necessary, a corrosion inhibitor, a hindered amine aging inhibitor and the like can be added to the aqueous hindered amine solution. As these inhibitors, conventionally usable inhibitors can be used.

In this connection, the expression "under atmospheric pressure" in the present invention covers a pressure range including the vicinity of the atmospheric pressure which permits the function of a blower or the like for feeding the combustion exhaust gas.

In view of the above-mentioned problems, the present inventors have intensively investigated an absorbent for use in the removal of $CO_2$ from the combustion exhaust gas, and as a result, they have found that the utilization of a mixture obtained by mixing a specific amine compound (X) with a relatively small amount of a specific amine compound (Y) is particularly effective to improve the absorption rate of the specific amine compound (X). In consequence, the present invention has now been achieved.

That is, the present invention is directed to a method for removing carbon dioxide from a combustion exhaust gas which comprises the step of bringing the combustion exhaust gas under atmospheric pressure into contact with a mixed aqueous solution of 100 parts by weight of an amine compound (X) selected from the group consisting of (A) a compound having one alcoholic hydroxyl group and a primary amino group in its molecule, said primary amino group being bonded to a tertiary carbon atom having two unsubstituted alkyl groups, (B) a compound having one alcoholic hydroxyl group and a tertiary amino group in its molecule, at least two groups bonded to said tertiary amino group having a chain of 2 or more carbon atoms inclusive of a bonded carbon atom, respectively, two of the groups bonded to said tertiary amino group being unsubstituted alkyl groups, and (C) diethanolamine; and 1–25 parts by weight of an amine compound (Y) selected from the group consisting of (D) piperazine, (E) piperidine, (F) morpholine, (G) glycine, (H) 2-piperidinoethanol, and (I) a compound having one alcoholic hydroxyl group and a secondary amino group in its molecule, said secondary amino group having an unsubstituted alkyl group of 3 or less carbon atoms and an N atom bonded to a group having a chain of 2 or more carbon atoms inclusive of a bonded carbon atom.

As a particularly preferable embodiment of the present invention, there can be recited a method for removing $CO_2$ from a combustion exhaust gas which comprises the step of bringing the combustion exhaust gas under atmospheric pressure into contact with a mixed aqueous solution of 100 parts by weight of an amine compound, as the above-mentioned amine compound (X), selected from the group consisting of 2-amino-2-methyl-1, 3-propanediol, 2-amino-2-methyl-1-propanol, 2-amino-2-ethyl-1, 3-propanediol, t-butyldiethanolamine and 2-amino-2-hydroxymethyl-1,3-propanediol; and 1–25 parts by weight of an amine compound, as the above-mentioned amine compound, selected from the group consisting of piperazine, piperidine, morpholine, glycine, 2-methylaminoethanol, 2-piperidineethanol and 2-ethylaminoethanol.

The combination of the specific amine compounds (X) and (Y) which can be used in the present invention are as described above. However, one amine compound (X) may be combined with one amine compound (Y), or alternatively, one of either group of the amine compounds (X) and (Y) may be combined with two or more of the other group.

One of the amine compounds which can be used in the present invention is (A) a compound having one alcoholic hydroxyl group and a primary amino group in its molecule, said primary amino group being bonded to a tertiary carbon atom having two unsubstituted alkyl groups. In this (A), the unsubstituted alkyl groups may be mutually identical or different, and their examples include a methyl group, an ethyl group and a propyl group. Preferably, both of the unsubstituted alkyl groups are the methyl groups. Typical examples of this (A) include 2-amino-2-methyl-1-propanol, 3-amino-3-methyl-2-pentanol, 2,3-dimethyl-3-amino-1-butanol, 2-amino-2-ethyl-1-butanol, 2-amino-2-methyl-3-pentanol, 2-amino-2-methyl-1-butanol, 3-amino-3-methyl-1-butanol, 3-amino-3-methyl-2-butanol, 2-amino-2,3-dimethyl-3-butanol, 2-amino-2,3-dimethyl-1-butanol and 2-amino-2-methyl-1-pentanol. Above all, 2-amino-2-methyl-1-propanol (AMP) is preferable.

Another compound of the amine compounds which can be used in the present invention is (B) a compound having one alcoholic hydroxyl group and a tertiary amino group in its molecule, at least two groups bonded to the tertiary amino group having a chain of 2 or more carbon atoms inclusive of a bonded carbon atom, respectively, two of the groups bonded to the tertiary amino group being unsubstituted alkyl groups. In this (B), the two unsubstituted alkyl group may be mutually identical or different, and their examples include a methyl group, an ethyl group, a propyl group and an isopropyl group. Typical examples of this (B) include 2-(dimethylamino)-ethanol, 2-(diethyl-amino)-ethanol, 2-(ethylmethylamino)-ethanol, 1-(dimethyl-amino)-ethanol, 1-(diethylamino)-ethanol, 1-(ethylmethylamino)-ethanol, 2-(diisopropylamino)-ethanol, 1-(diethylamino)-2-propanol and 3-(diethylamino)-1-propanol, and above all, 2-(diethylamino)-ethanol (hereinafter abbreviated to "DEAE") are preferable.

Still another compound of the amine compounds which can be used in the present invention is (I) a compound having one alcoholic hydroxyl group and a secondary amino group in its molecule, the secondary amino group having an unsubstituted alkyl group of 3 or less carbon atoms and an N atom bonded to a group having a chain of 2 or more carbon atoms inclusive of a bonded carbon atom. In this (I), an example of the chain of 2 or more carbon atoms inclusive of the bonded carbon atom is usually an hydroxyl group-substituted alkyl group of 2–5 carbon atoms, preferably an hydroxyl group-substituted alkyl group of 2–3 carbon atoms. Typical examples of this (I) include 2-(ethylamino)-ethanol, 2-(methylamino)-ethanol, 2-(propylamino)-ethanol, 2-(isopropylamino)-ethanol, 1-(ethylamino)-ethanol, 1-(methylamino)-ethanol, 1-(propylamino)-ethanol and 1-(isopropylamino)-ethanol, and above all, 2-(ethylamino)-ethanol and 2-(methylamino)-ethanol (hereinafter abbreviated to "MAE") are preferably used.

With regard to a mixing ratio of the amine compounds (X) and (Y), the amine compound (Y) is in the range of 1 to 25 parts by weight, preferably in the range of 1 to 10 parts by weight, based on 100 parts by weight of (X) in the case that the amine compound (X) comprises (A) and/or (B). Furthermore, the amine compound (Y) is in the range of 1 to 25% by weight, preferably in the range of 10 to 25% by weight, based on 100 parts by weight of (X) in the case that the amine compound (X) comprises (C) diethanol. The concentration of the amine compound (X) in the mixed aqueous solution (which may be called an absorbing solution) is usually from 15 to 65% by weight, depending upon the kind of (X). The temperature of the mixed aqueous solution at the time of the contact with the combustion exhaust gas is usually in the range of 30 to 70° C.

If necessary, a corrosion inhibitor, a hindered amine aging inhibitor and the like can be added to the mixed aqueous solution which can be used in the present invention.

In this connection, the expression "under atmospheric pressure" in the present invention covers a pressure range including the vicinity of the atmospheric pressure which permits the function of a blower or the like for feeding the combustion exhaust gas.

DETAILED DESCRIPTION OF PREFERRED EMBODIMENTS

Figure 1:
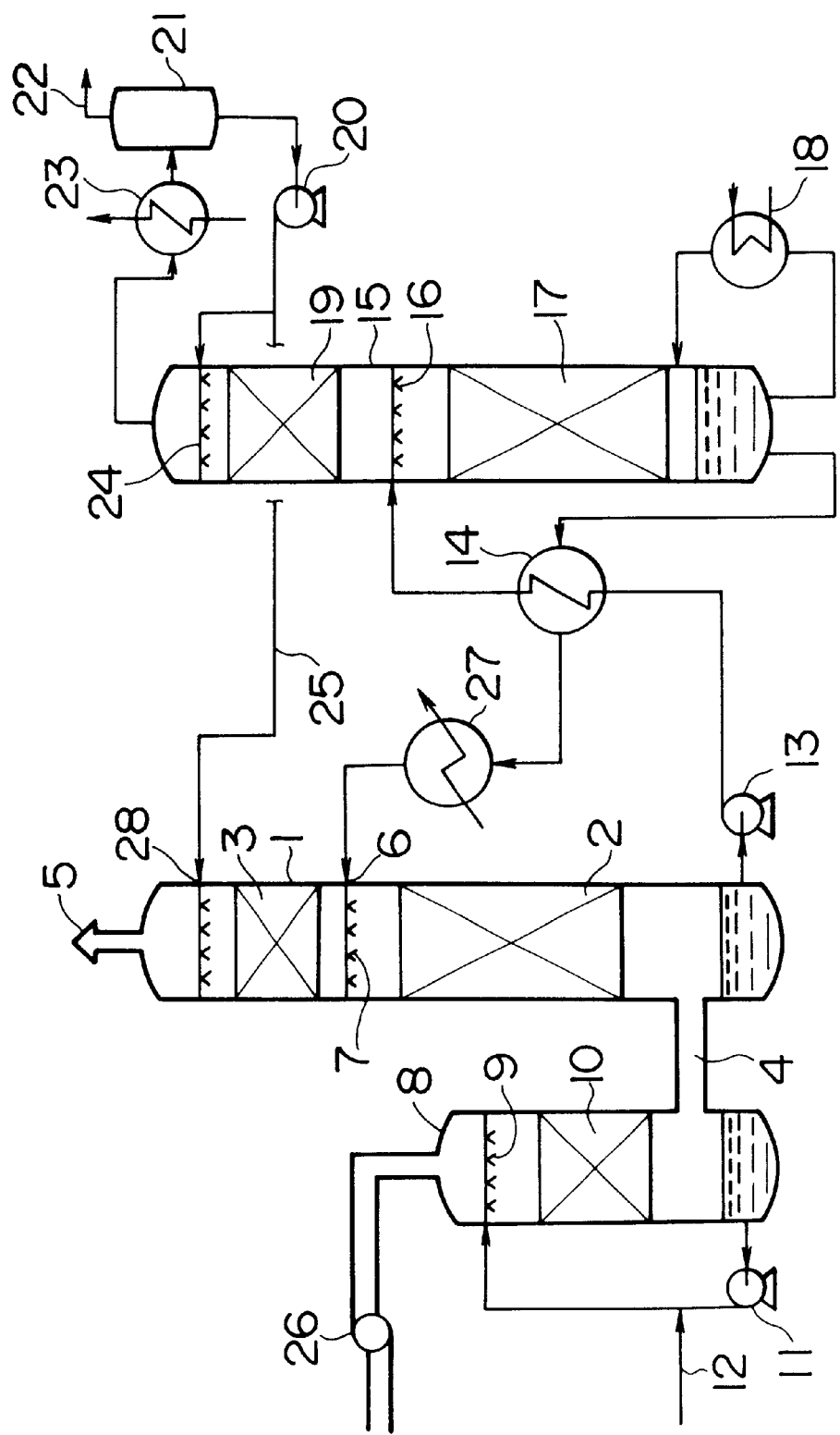
FIG. 1 is a flow sheet of one example of processes which can be employed in the present invention.

No particular restriction is put on a process which can be employed in a method for removing $CO_2$ from a combustion exhaust gas according to the present invention, and its one example will be described in reference to FIG. 1. In FIG. 1, only main facilities are shown, and attachment devices are omitted.

In FIG. 1, numeral 1 is a $CO_2$ removing tower, 2 is a lower filling portion, 3 is an upper filling portion or a tray, 4 is a $CO_2$ removing tower combustion exhaust gas feed opening, 5 is a $CO_2$-free combustion exhaust gas discharge opening, 6 is an absorbing solution feed opening, 7 is a nozzle, 8 is a combustion exhaust gas cooler which can be provided when needed, 9 is a nozzle, 10 is a filling portion, 11 is a humidifying/cooling water circulating pump, 12 is a supplemental water feed line, 13 is a $CO_2$-containing absorbing solution discharge pump, 14 is a heat exchanger, 15 is an absorbing solution reproducing tower (which can also simply be called "reproducing tower"), 16 is a nozzle, 17 is a lower filling portion, 18 is a reproducing heater (reboiler), 19 is an upper filling portion, 20 is a reflux water pump, 21 is a $CO_2$ separator, 22 is a recovered $CO_2$ discharge line, 23 is a reproducing tower reflux condenser, 24 is a nozzle, 25 is a reproducing tower reflux water feed line, 26 is a combustion exhaust gas feed blower, 27 is a cooler, and 28 is a reproducing tower reflux water feed opening.

In FIG. 1, the combustion exhaust gas is introduced into the combustion exhaust gas cooler 8 by means of the combustion exhaust gas feed blower 26, brought into contact with humidifying/cooling water from the nozzle 9 in the filling portion 10, humidified/cooled therein, and then led to the $CO_2$ removing tower 1 through the $CO_2$ removing tower combustion exhaust gas feed opening 4. The humidifying/cooling water which has been brought into contact with the combustion exhaust gas is stored in the lower portion of the combustion exhaust gas cooler 8, and it is then circulated to the nozzle 9 by means of the pump 11 and used again. The humidifying/cooling water is gradually lost, while used to humidify/cool the combustion exhaust gas, and therefore it is replenished through the supplemental water feed line 12. When the humidified/cooled combustion exhaust gas is further cooled in view of the state of this gas, a heat exchanger can be disposed between the humidifying/cooling water circulating pump 11 and the nozzle 9 to cool the humidifying/cooling water, and the thus cooled water can be then fed to the combustion exhaust gas cooler The combustion exhaust gas introduced into the $CO_2$ removing tower 1 is brought into counterflow contact with the absorbing solution having a predetermined concentration fed from the nozzle 7 in the lower filling portion 2, whereby $CO_2$ in the combustion exhaust gas is absorbed/removed by the absorbing solution. Afterward, the $CO_2$-free combustion exhaust gas streams toward the upper filling portion 3. The absorbing solution fed to the $CO_2$ removing tower 1 absorbs $CO_2$, and the temperature of the absorbing solution becomes higher than a temperature thereof at the feed opening 6 owing to absorption heat generated by the absorption. The absorbing solution is then forwarded to the heat exchanger 14 by means of the $CO_2$-containing absorbing solution discharge pump 13, and it is heated and then led to the absorbing solution reproducing tower 15. The temperature adjustment of the reproduced absorbing solution can be carried out by the heat exchanger 14 or the cooler 27 disposed between the heat exchanger 14 and the feed opening 6, if necessary.

In the absorbing solution reproducing tower 15, the absorbing solution is reproduced in the lower filling portion 17 by heating of the reproducing heater 18, and then cooled by the heat exchanger 14, and then returned to the $CO_2$ removing tower 1. In the upper portion of the absorbing solution reproducing tower 15, $CO_2$ separated from the absorbing solution is brought into contact with reflux water fed from the nozzle 24 in the upper filling portion 19, and then cooled by the reproducing tower reflux condenser 23. Afterward, in $CO_2$ separator 21, $CO_2$ is separated from reflux water formed by the condensation of water vapor accompanied with $CO_2$, and then led to a $CO_2$ recovery process through the recovered $CO_2$ discharge line 22. A large part of the reflux water is refluxed to the absorbing solution reproducing tower 15 by means of the reflux water pump 20, and a small part of the reflux water is fed to the reproducing tower reflux water feed opening 28 of the $CO_2$ removing tower 1 through the reproducing tower reflux water feed line 25. Since this reproducing tower reflux water contains a small amount of the absorbing solution, it is brought into contact with the exhaust gas in the upper filling portion 3 of the $CO_2$ removing tower 1, thereby contributing to the removal of a small amount of $CO_2$ contained in the exhaust gas.

Now, the present invention will be described in detail in reference to examples.

EXAMPLES 1 to 5, COMPARATIVE EXAMPLE 1

50 ml of an absorbing solution comprising a 30% by weight aqueous hindered amine solution was placed in a glass reaction vessel (flask) disposed in a thermostatic chamber, and a mixed gas (a test gas) was fed to the flask with stirring at 40° C. at a flow rate of 1 liter/minute under atmospheric pressure. The test gas used herein was a model combustion exhaust gas (which corresponds to an LNG-fired exhaust gas) at 40° C. having a composition of 10 mole % of $CO_2$, 3 mole % of $O_2$ and 87 mole % of $N_2$.

The test gas was continuously fed thereto, and when the $CO_2$ concentration of the fed gas was equal to that of the discharged gas, $CO_2$ contained in the absorbing solution was measured by the use of a $CO_2$ analyzer (a total organic carbon meter) to measure a $CO_2$ absorption in a saturation state. Similar tests were carried out at temperatures of 60° C. and 80° C.

Furthermore, for comparison, a 30% by weight aqueous MEA solution was similarly used.

Figure 2:
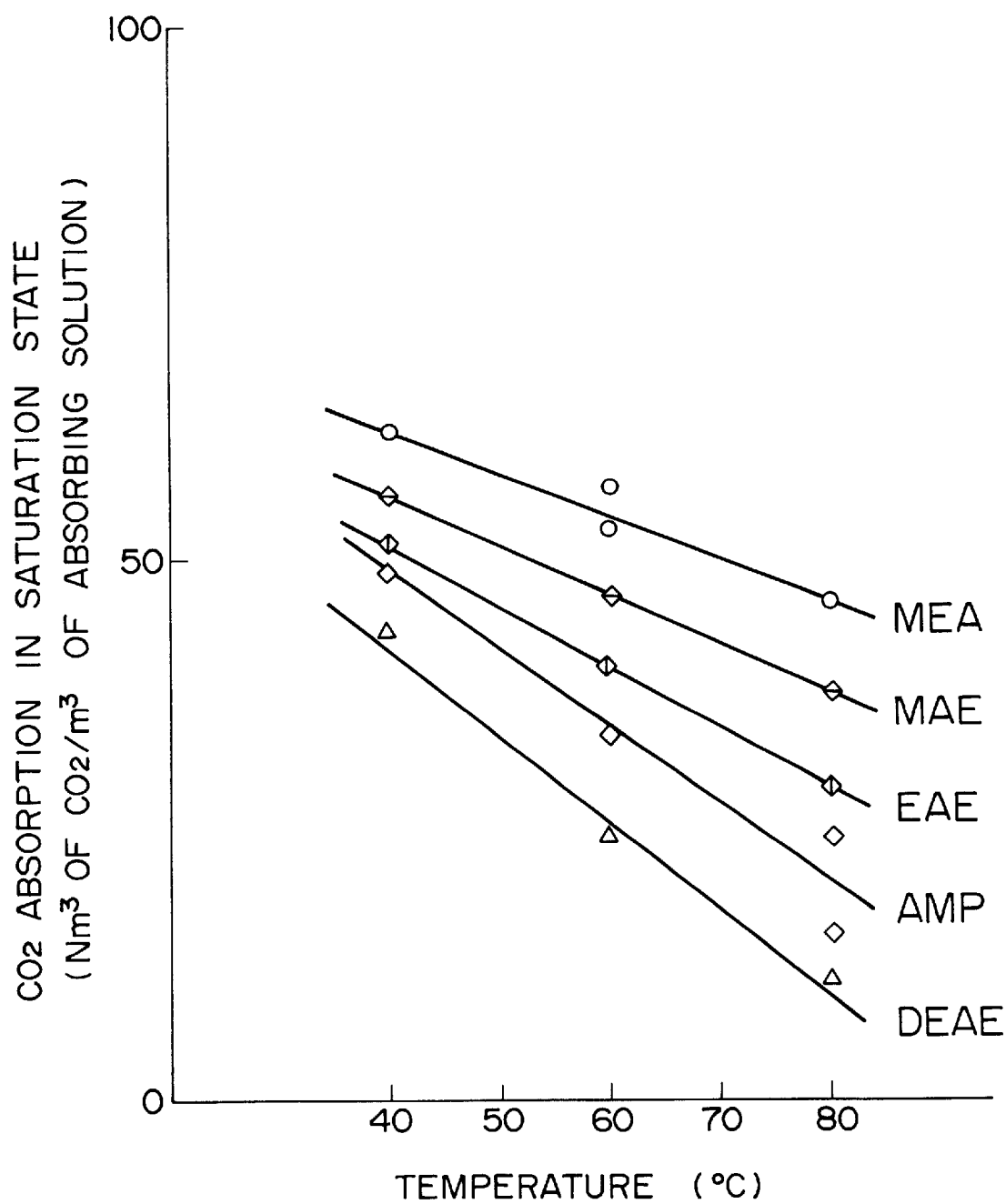
FIG. 2 is a graph showing a relation between the absorption of an absorbing solution ($Nm^3$ of $CO_2/m^3$ of absorbing solution, ordinate axis) and a temperature (° C., abscissa axis) in Examples 1 to 4 and Comparative Example 1.

The obtained results are set forth in Table 1 (the results at 40° C.) and in FIG. 2. In FIG. 2, the unit of an ordinate axis is $Nm^3$ of $CO_2/m^3$ of the aqueous solution, and that of an abscissa axis was a temperature (° C.).

A tangential gradient at the beginning of the gas feed was calculated from a relation graph between the $CO_2$ concentration of the gas at a flask outlet and a gas feed time, and a $CO_2$ initial absorption rate of the absorbing solution was obtained in a ratio to that of the aqueous MEA solution at the same concentration.

TABLE 1

| Test Absorbing Solution (30 wt % Aqueous Solution) | Absorption of $CO_2$ in Saturation State | | Initial Absorption Rate (MEA Aqueous Solution = 1) |
|---|---|---|---|
| | mole of $CO_2$/mole of Amine | $Nm^3$ of $CO_2/m^3$ of Absorbing Solution | |
| Comp. Ex. 1 MEA | 0.56 | 61.2 | 1.00 |
| Example 1 AMP | 0.72 | 54.4 | 0.69 |
| Example 2 MAE | 0.63 | 56.0 | 1.00 |
| Example 3 EAE | 0.68 | 51.3 | 0.91 |
| Example 4 DEAE | 0.75 | 42.2 | 0.36 |
| Example 5 HEP | 0.84 | 43.9 | 0.90 |

As is apparent from the results in Table, 1, the initial absorbing rates of the aqueous hindered amine solutions which are the absorbing solutions of the present invention are not so low as to be anticipated except DEAE, and they are at such levels as to be equal to or a little smaller than MEA. It is possible to improve the absorption rate by the addition of an absorption accelerator.

On the other hand, the absorption of $CO_2$ per unit mole of the hindered amine is larger in all the cases of the aqueous hindered amine solutions than in the case of MEA. In addition, the absorption of $CO_2$ per unit volume of the absorbing solution is slightly smaller in the cases of MAE and AMP than in the case of MEA, depending upon the kind of hindered amine.

It is apparent from FIG. 2 that the absorption of $CO_2$ decreases more largely with the elevation of an absorbing solution temperature in the cases the hindered amines typified by AMP than in the case of MEA. This indicates that heat energy can be more saved in the reproduction of the absorbing solution in the cases of these hindered amines than in the case of MEA.

As described above, when a combustion exhaust gas under atmospheric pressure is treated with a specific aqueous hindered amine solution as an absorbing solution in accordance with the present invention, the removal of $CO_2$ can efficiently be achieved from the viewpoints of absorption power and the reproduction energy of the absorbing solution, though the $CO_2$ absorption rate of the aqueous hindered amine solution regarding the present invention is equal to or slightly lower than that of MEA.

EXAMPLES 6 to 8, COMPARATIVE EXAMPLES 2 to 4

50 ml of an absorbing solution, i.e., an aqueous solution prepared by mixing an amine compound (X) selected from 2-amino-2-methyl-1-propanol (AMP), diethanolamine (DEA) and monoethanolamine (MEA) with an amine compound (Y) selected from 2-(methylamino)-ethanol (MAE) and piperazine in each ratio shown in Table 2 was placed in a glass reaction vessel (flask) disposed in a thermostatic chamber, and a mixed gas (a test gas) was fed to the flask with stirring at 40° C. at a flow rate of 1 liter/minute under atmospheric pressure. The test gas used herein was a model combustion exhaust gas (which corresponds to an LNG-fired exhaust gas) at 40° C. having a composition of 10 mole % of $CO_2$, 3 mole % of $O_2$ and 87 mole % of $N_2$.

The test gas was continuously allowed to stream, and when the $CO_2$ concentration of the fed gas was equal to that of the discharged gas, $CO_2$ contained in the absorbing solution was measured by the use of a $CO_2$ analyzer (a total organic carbon meter) to measure the absorption of $CO_2$ in a saturation state ($Nm^3$ of $CO_2/m^3$ of the absorbing solution, and mole of $CO_2$/mole of the absorbing solution).

A tangential gradient at the beginning of the gas feed was calculated from a relation graph between the $CO_2$ concentration of the gas at a flask outlet and a gas feed time, and a $CO_2$ initial absorption rate of the absorbing solution was obtained in a ratio to an initial absorption rate in the aqueous MEA solution at the same concentration as in the amine compound (X).

The same test as described above was carried out at 60° C.,

Furthermore, for comparison, each single solution of the amine compounds (X), i.e., MEA, DEA and AMP was subjected to an absorption test at 40° C., 60° C. and 80° C.

Figure 3:
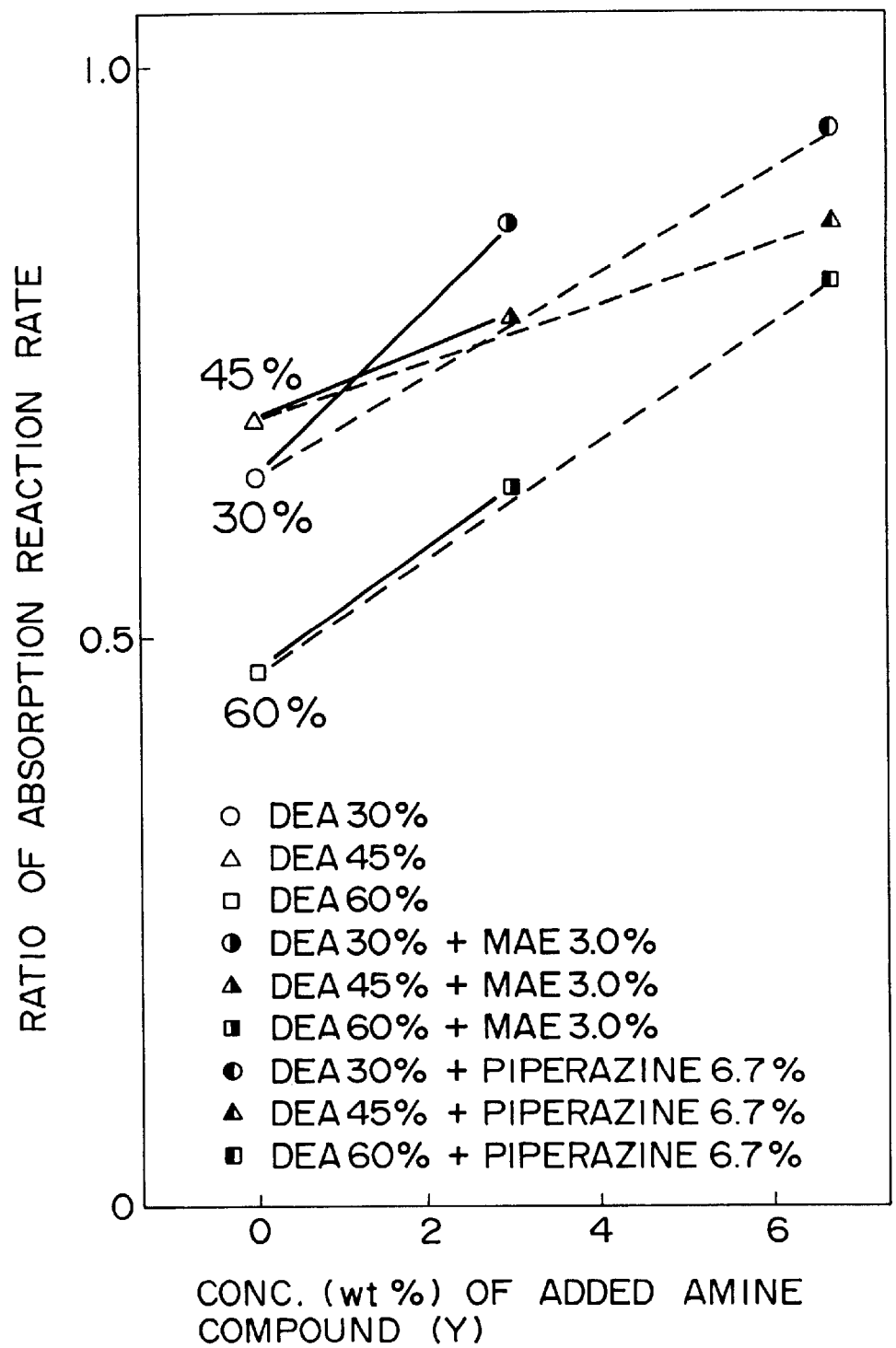
FIG. 3 shows an addition effect of an amine compound (Y) in an absorbing solution using DEA in Examples 2 to 8.

The obtained results are set forth in Tables 2 to 4 and FIG. 3. This FIG. 3 shows an addition effect of the amine compound (Y) at a temperature of 40° C. in the case that DEA was used as the amine compound (X), and in this drawing, an abscissa axis was the concentration of MAE and piperazine as the amine compounds (Y) and an ordinate axis was an absorption reaction rate ratio.

TABLE 2

$CO_2$ Absorption of Absorbing Test Solution in Saturation Stat ($Nm^3$ of $CO_2/m^3$ of Solution)

| Absorbing Test Solution | | (wt %) | Absorption of $CO_2$ in Saturation State ($Nm^3$ of $CO_2/m^3$ of Solution) | |
|---|---|---|---|---|
| | | | 40° C. | 60° C. |
| Comp. Example 2 | Monoethanolamine (MEA) | 30% | 61.15 | 56.45 |
| | | 45% | 89.15 | 79.74 |
| | | 60% | 101.70 | 105.73 |
| Comp. Example 3 | Diethanolamine (DEA) | 30% | 34.27 | 23.30 |
| | | 45% | 47.04 | 34.94 |
| | | 60% | 56.45 | 43.90 |
| Comp. Example 4 | 2-amino-2-methyl-1-propanol (AMP) | 30% | 54.43 | 33.38 |
| Example 6 | AMP + (1) | 30% | 56.22 | 37.41 |
| | AMP + (2) | 30% | 62.50 | 48.16 |
| Example 7 | DEA + (1) | 30% | 36.74 | 28.45 |
| | | 45% | 49.50 | 37.86 |
| | | 60% | 62.94 | 48.16 |
| Example 8 | DEA + (2) | 30% | 46.59 | 37.18 |
| | | 45% | 59.81 | 46.37 |
| | | 60% | 72.13 | 57.34 |

AMP + (1): 50 ml of AMP test solution + 1.5 g (0.02 mole) of MAE
AMP + (2): 50 ml of AMP test solution + 3.34 g (0.02 mole) of piperazine
DEA + (1): 50 ml of DEA test solution + 1.5 g (0.02 mole) of MAE
DEA + (2): 50 ml of DEA test solution + 3.34 g (0.02 mole) of piperazine

TABLE 3

CO$_2$ Absorption of Absorbing Test Solution
in Saturation Stat (mole of CO$_2$/mole of Solution)

| Absorbing | | | Absorption of CO$_2$ in Saturation State (mole of CO$_2$/mole of Soln.) | |
|---|---|---|---|---|
| | Test Solution | (wt %) | 40° C. | 60° C. |
| Comp. Example 2 | Monoethanolamine (MEA) | 30% | 0.56 | 0.51 |
| | | 45% | 0.54 | 0.48 |
| | | 60% | 0.46 | 0.48 |
| Comp. Example 3 | Diethanolamine (DEA) | 30% | 0.54 | 0.36 |
| | | 45% | 0.49 | 0.36 |
| | | 60% | 0.44 | 0.34 |
| Comp. Example 4 | 2-amino-2-methyl-1-propanol (AMP) | 30% | 0.72 | 0.44 |
| Example 6 | AMP + (1) | 30% | 0.67 | 0.44 |
| | AMP + (2) | 30% | 0.67 | 0.52 |
| Example 7 | DEA + (1) | 30% | 0.50 | 0.39 |
| | | 45% | 0.47 | 0.36 |
| | | 60% | 0.46 | 0.35 |
| Example 8 | DEA + (2) | 30% | 0.57 | 0.54 |
| | | 45% | 0.53 | 0.41 |
| | | 60% | 0.49 | 0.39 |

AMP + (1): 50 ml of AMP test solution + 1.5 g (0.02 mole) of MAE
AMP + (2): 50 ml of AMP test solution + 3.34 g (0.02 mole) of piperazine
DEA + (1): 50 ml of DEA test solution + 1.5 g (0.02 mole) of MAE
DEA + (2): 50 ml of DEA test solution + 3.34 g (0.02 mole) of piperazine

TABLE 4

Absorption Reaction Initial Rate Ratio of Absorbing Test Solution

| Absorbing | | | Ratio of Absorption Reaction Initial Rate | |
|---|---|---|---|---|
| | Test Solution | (wt %) | 40° C. | 60° C. |
| Comp. Example 2 | Monoethanolamine (MEA) | 30% | 1.00 | 1.03 |
| | | 45% | 1.00 | 1.06 |
| | | 60% | 0.97 | 1.05 |
| Comp. Example 3 | Diethanolamine (DEA) | 30% | 0.64 | 0.84 |
| | | 45% | 0.69 | 0.87 |
| | | 60% | 0.47 | 0.82 |
| Comp. Example 4 | 2-amino-2-methyl-1-propanol (AMP) | 30% | 0.69 | 0.95 |
| Example 6 | AMP + (1) | 30% | 0.95 | 1.00 |
| | AMP + (2) | 30% | 0.97 | 0.97 |
| Example 7 | DEA + (1) | 30% | 0.86 | 0.95 |
| | | 45% | 0.77 | 0.91 |
| | | 60% | 0.63 | 0.82 |
| Example 8 | DEA + (2) | 30% | 0.94 | 1.00 |
| | | 45% | 0.86 | 1.01 |
| | | 60% | 0.81 | 0.94 |

Figure 4:
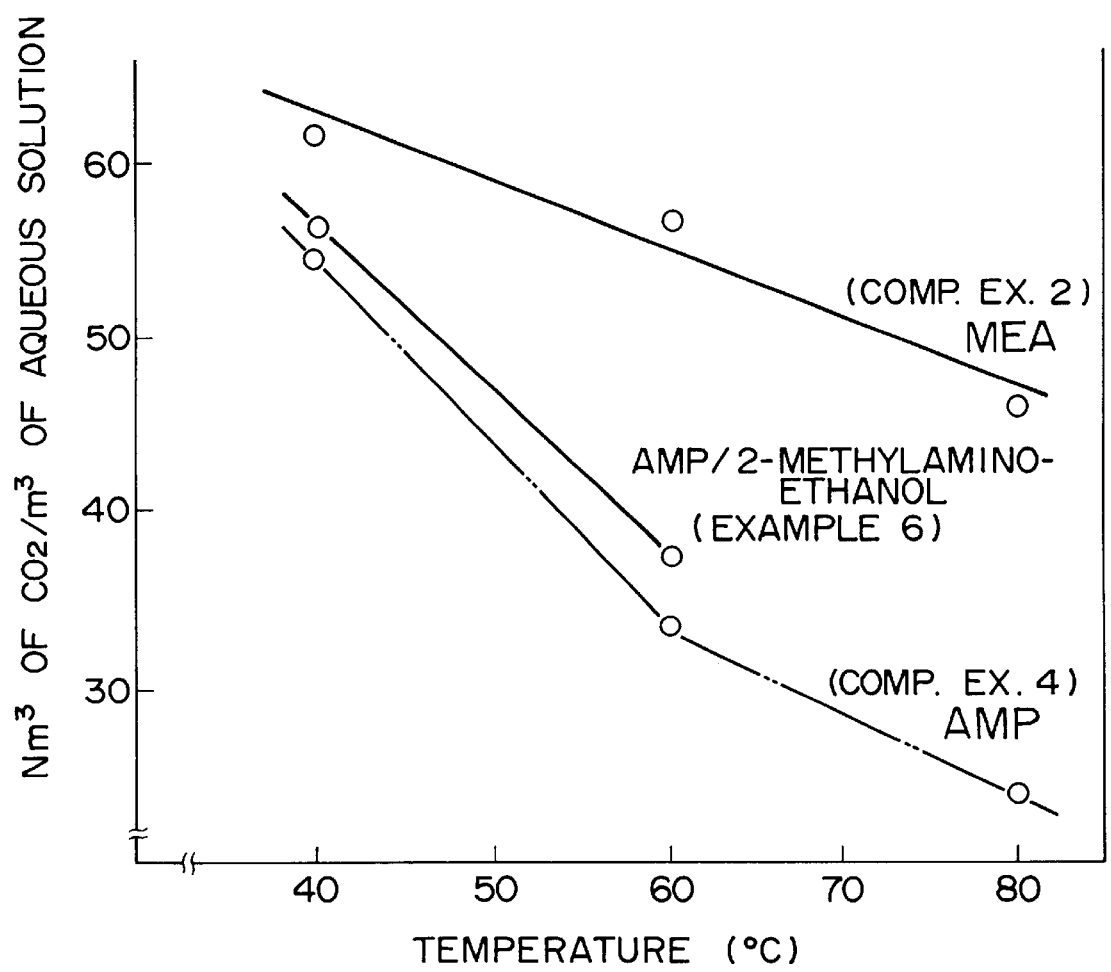
FIG. 4 is a graph showing a relation between the absorption of an absorbing solution ($Nm^3$ of $CO_2/m^3$ of absorbing solution, ordinate axis) and a temperature (° C., abscissa axis) in Example 6.

AMP + (1): 50 ml of AMP test solution + 1.5 g (0.02 mole) of MAE
AMP + (2): 50 ml of AMP test solution + 3.34 g (0.02 mole) of piperazine
DEA + (1): 50 ml of DEA test solution + 1.5 g (0.02 mole) of MAE
DEA + (2): 50 ml of DEA test solution + 3.34 g (0.02 mole) of piperazine Furthermore, FIG. 4 shows a relation between the absorption of CO$_2$ (Nm$^3$ of CO$_2$/m$^3$ of the absorbing solution) and temperature. It is apparent from FIG. 4 that the absorption of CO$_2$ decreases more largely with the elevation of the absorbing solution temperature in the case that a mixture of AMP and 2-methylaminoethanol was used than in the case that MEA was used. This indicates that heat energy can be more saved in the reproduction of the absorbing solution in the case of the mixture of AMP and 2-methylaminoethanol than in the case of MEA.

EXAMPLE 9, COMPARATIVE EXAMPLE 5

Figure 5:
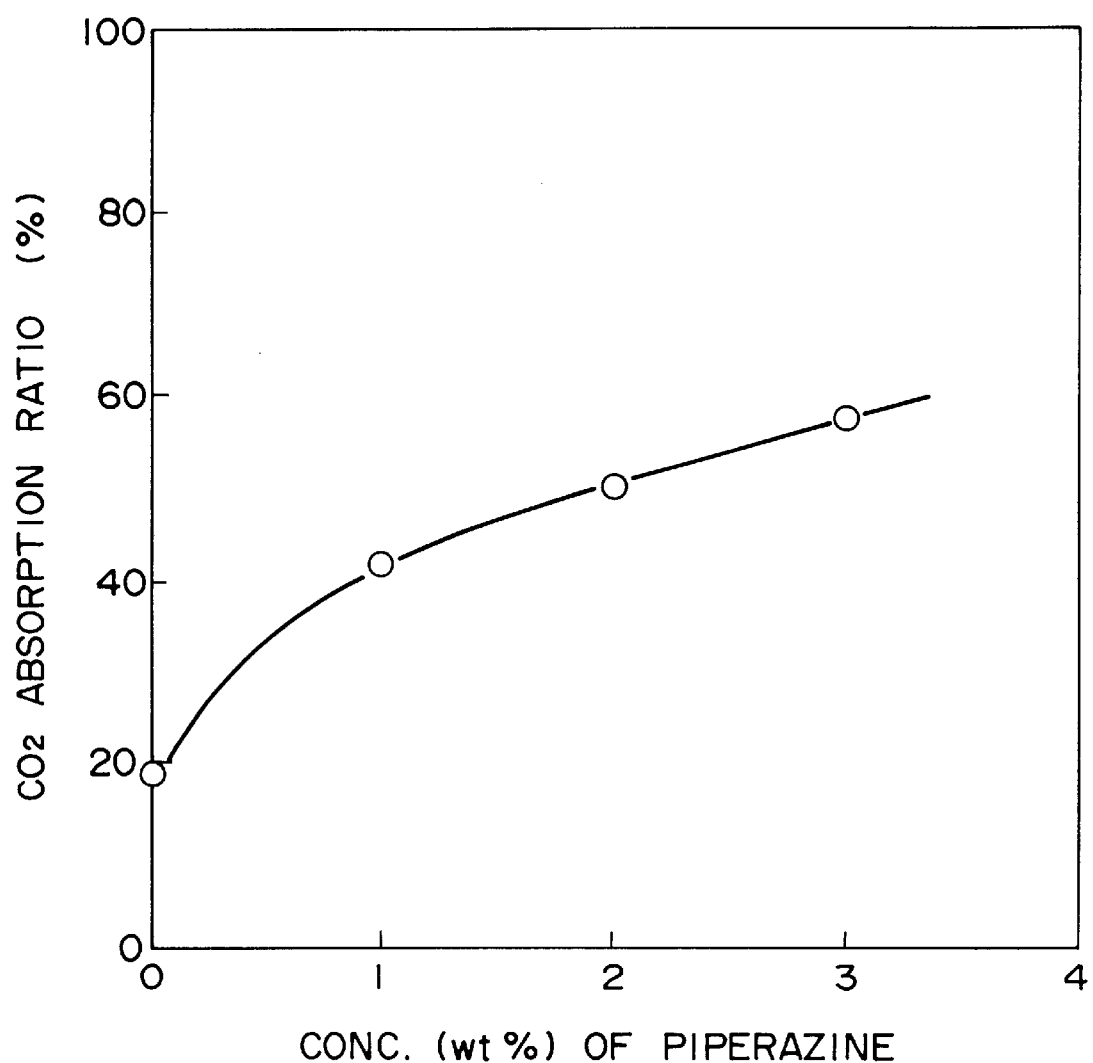
FIG. 5 shows an addition effect of piperazine in an absorbing solution using DEAE in Example 9.

In order to inspect an effect of a reaction accelerator, a test was made by the use of a wet wall type absorbing tower having a diameter of 15 mm and a length of 7.5 mm which was the model of an absorbing tower used in an actual process. In this test, a 30% by weight DEAE solution was used as an absorbing solution, an actual boiler combustion exhaust gas (CO$_2$=9 mole %, O$_2$=2 mole %, water vapor=saturation state, N$_2$=mole % of balance) was used as a combustion exhaust gas, an L/G was 2.0 liters/m$^3$N, a liquid temperature and a gas temperature were both maintained at 40° C., and a gas flow rate was 3.1 m/sec. The results are set forth in FIG. 5. In this FIG. 5, an ordinate axis was an absorption ratio of CO$_2$ absorbed from the fed combustion exhaust gas, and an abscissa axis was a concentration of piperazine added to the absorbing solution. The absorption reaction acceleration effect of piperazine to DEAE was apparent from FIG. 5.

As is definite from the above-mentioned results, when an amine compound (X) is mixed with a relatively small amount of an amine compound (Y) and then used in accordance with the present invention, an initial absorption rate can be improved more largely than in the case that the amine compound (X) is singly used. In addition, the absorption of CO$_2$ per unit mole of (X) of a mixed absorbing solution is larger than in the case that MEA is used.

As described above, when a mixed aqueous solution of a specific amine compound (X) and a specific amine compound (Y) is used as an absorbing solution for a combustion exhaust gas under atmospheric pressure in accordance with a method of the present invention, an absorption rate of CO$_2$ can be improved more largely than when the amine compound (X) is singly used. Additionally, according to the present invention, the removal of CO$_2$ can be more efficiently achieved from the viewpoints of absorption and reproduction energy than when MEA is used.

What is claimed is:

1. A method for removing carbon dioxide from a combustion exhaust gas containing oxygen gas which comprises the step of bringing said combustion exhaust gas under atmospheric pressure into contact with an aqueous solution consisting essentially of an absorbent selected from the group consisting of 2-(methylamino)-ethanol and 2-ethylamino ethanol.

2. A method for removing carbon dioxide from a combustion exhaust gas containing oxygen gas consisting of the step of bringing the combustion exhaust gas under atmospheric pressure into contact with a mixed aqueous solution of 100 parts by weight of 2-amino-2-methyl-1-propanol; and 1–25 parts by weight of piperazine.

3. A method of removing carbon dioxide from a combustion exhaust gas containing oxygen gas which comprises the step of bringing the combustion exhaust gas under atmospheric pressure into contact with a mixed aqueous solution of 100 parts by weight of an amine compound selected from the group consisting of 2-amino-2-methyl-1, 3-propanediol, 2-amino-2-ethyl-1, 3-propanediol and 2-amino-2-hydroxymethyl-1, 3-propanediol; and 1–25 parts by weight of an amine compound selected from the group consisting of morpholine, glycine, 2-(methylamino)-ethanol and 2-(2-hydroxyethyl)piperdine.

4. The method of claim 1, wherein said combustion exhaust gas contains from about 9 to about 10% by volume of CO$_2$ and about 2 to about 3% by volume of O$_2$.

5. The method of claim 2, wherein said combustion exhaust gas contains from about 9 to about 10% by volume of CO$_2$ and about 2 to about 3% by volume of O$_2$.

6. The method of claim 3, wherein said combustion exhaust gas contains from about 9 to about 10% by volume of CO$_2$ and about 2 to about 3% by volume of O$_2$.

7. The method of claim 1, wherein the concentration of the absorbent is 25–65% by weight.

* * * * *